US011981523B2

(12) United States Patent
Yamamoto et al.

(10) Patent No.: US 11,981,523 B2
(45) Date of Patent: May 14, 2024

(54) SHEET CONVEYING DEVICE AND IMAGE FORMING SYSTEM INCORPORATING THE SHEET CONVEYING DEVICE

(71) Applicants: Taiki Yamamoto, Ibaraki (JP); Takahiro Ogino, Kanagawa (JP); Takashi Ebihara, Ibaraki (JP); Satoshi Kohara, Tokyo (JP); Kazuhiro Shimojima, Ibaraki (JP)

(72) Inventors: Taiki Yamamoto, Ibaraki (JP); Takahiro Ogino, Kanagawa (JP); Takashi Ebihara, Ibaraki (JP); Satoshi Kohara, Tokyo (JP); Kazuhiro Shimojima, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 17/717,569

(22) Filed: Apr. 11, 2022

(65) Prior Publication Data

US 2022/0324670 A1 Oct. 13, 2022

(30) Foreign Application Priority Data

Apr. 13, 2021 (JP) ................................ 2021-067677

(51) Int. Cl.

| | |
|---|---|
| ***B41J 11/00*** | (2006.01) |
| ***B65H 29/24*** | (2006.01) |
| ***B65H 29/52*** | (2006.01) |
| ***G03G 15/00*** | (2006.01) |

(52) U.S. Cl.
CPC ........ *B65H 29/246* (2013.01); *B41J 11/0045* (2013.01); *B65H 29/52* (2013.01); *G03G 15/657* (2013.01); *B65H 2301/42124* (2013.01)

(58) Field of Classification Search
CPC .... B41J 11/0045; B41J 11/006; B41J 13/103; B41J 11/106; B41J 2404/693; G03G 15/657; B65H 2301/42124; B65H 29/246; B65H 29/52; B65H 2404/61; B65H 2404/693; B65H 3/128; B65H 3/54
See application file for complete search history.

(56) References Cited

U.S. PATENT DOCUMENTS

| | | | | |
|---|---|---|---|---|
| 5,876,030 A * | 3/1999 | Dobbertin | B65H 3/128 | 271/169 |
| 8,083,223 B2 * | 12/2011 | Ikeda | B65H 1/14 | 271/145 |
| 2016/0107853 A1 * | 4/2016 | Hashimoto | B65H 1/14 | 271/97 |
| 2020/0122491 A1 | 4/2020 | Ogawa | | |

FOREIGN PATENT DOCUMENTS

| | | |
|---|---|---|
| JP | 2008-094603 | 4/2008 |
| JP | 2020-066532 | 4/2020 |

* cited by examiner

*Primary Examiner* — Jennifer Bahls
(74) *Attorney, Agent, or Firm* — Harness, Dickey & Pierce, P.L.C.

(57) ABSTRACT

A sheet conveying device includes a sheet stacker, an air blower, and a guide. The sheet stacker stacks sheets. The air blower blows air to the sheets. The guide faces an uppermost sheet on the sheet stacker. A set height of a contact portion of the guide to contact the uppermost sheet is changeable.

7 Claims, 10 Drawing Sheets

SHEET CONVEYING DEVICE AND IMAGE FORMING SYSTEM INCORPORATING THE SHEET CONVEYING DEVICE

CROSS-REFERENCE TO RELATED APPLICATION

This patent application is based on and claims priority pursuant to 35 U.S.C. § 119(a) to Japanese Patent Application No. 2021-067677, filed on Apr. 13, 2021, in the Japan Patent Office, the entire disclosure of which is hereby incorporated by reference herein.

BACKGROUND

Technical Field

Embodiments of the present disclosure relate to a sheet conveying device and an image forming system incorporating the sheet conveying device.

Related Art

As known in the art, sheet feeding devices include a sheet stacker that contains sheets, an air blowing device that blows air to the sheets, and a guide to face the uppermost sheet placed on top of the sheets in the sheet stacker.

SUMMARY

According to an embodiment of the present disclosure, a sheet conveying device includes a sheet stacker, an air blower, and a guide. The sheet stacker stacks sheets. The air blower blows air to the sheets. The guide faces an uppermost sheet on the sheet stacker. A set height of a contact portion of the guide to contact the uppermost sheet is changeable.

According to another embodiment of the present disclosure, an image forming system includes the sheet conveying device and an image forming apparatus to form an image on a sheet. The sheet conveying device and the image forming apparatus are integrated as a single unit or coupled as separate units.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
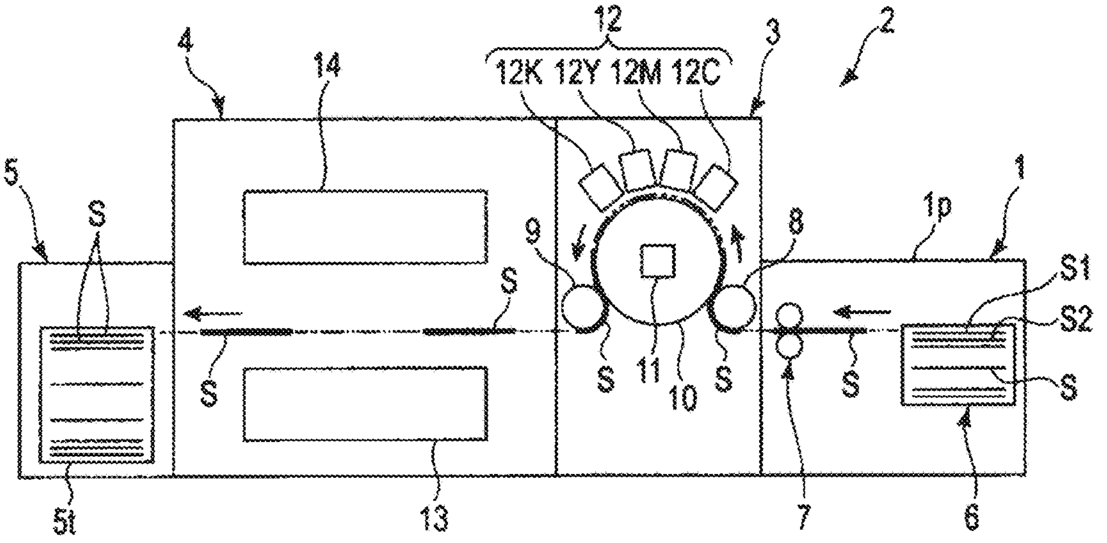
FIG. 1 is a schematic diagram illustrating an overall configuration of an image forming system including a sheet conveying device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, descriptions are given of a sheet conveying device included in an image forming system according to an embodiment of the present disclosure. FIG. 1 is a diagram illustrating an overall configuration of an image forming system 2 including a sheet conveying device 1, according to an embodiment of the present embodiment. The image forming system 2 includes the sheet conveying device 1, an image forming apparatus 3, a drying device 4, and a sheet ejecting device 5, which are mutually connected. After a sheet S is fed from the sheet conveying device 1, an image is formed on the sheet S by the image forming apparatus 3. Then, the sheet S is dried by the drying device 4 to be stacked on a sheet ejection tray 5*t* of the sheet ejecting device 5.

The image forming system 2 may have a configuration of a known inkjet type image forming system. Further, the term "image" indicates not only an image (including a color image and a monochrome image) having meanings such as texts and figures on a recording medium but also an image having no meaning such as patterns on a recording medium. Furthermore, the term "sheet" (for example, the sheets S) has no limitation in the material, thickness, shape, size, weight, and the like. For example, the sheet is not limited to indicate a paper material but also includes a recording medium such as thread, fiber, cloth, leather, metal, synthetic resin, plastic, glass, wood, ceramics, or the like. The inkjet image forming system may be replaced with an electrophotographic image forming system in which an image is formed with toner.

The sheet conveying device 1 includes a sheet feeding unit 6 and a registration roller pair 7. The sheet feeding unit 6 and the registration roller pair 7 are housed in an interior of a housing 1*p* of the sheet conveying device 1. A door is openably and closably attached to the housing 1*p*. On the other hand, by opening the door, the sheet feeding unit 6 is pulled out from the housing 1*p* of the sheet conveying device 1.

A sheet bundle including the sheets S is disposed in the sheet feeding unit 6. The sheet feeding unit 6 blows air to the sheet bundle to separate a sheet S1 that serves as a conveyance target object (for example, an uppermost sheet of the sheet bundle) one by one from a subsequent sheet S2 of the sheet bundle, so that the uppermost sheet S1 is fed out from the sheet feeding unit 6. The registration roller pair 7 conveys the sheet S (e.g., the uppermost sheet S1 of the sheet bundle) fed from the sheet feeding unit 6 to the image forming apparatus 3. A detailed description of the sheet feeding unit 6 is described below.

The image forming apparatus 3 includes a receiving cylinder 8, a transfer cylinder 9, a sheet carrying drum 10, an air suction unit 11, and an ink discharge unit 12. Sheet grippers are provided on a surface of the receiving cylinder 8, a surface of the transfer cylinder 9, and an outer circumferential surface of the sheet carrying drum 10. Each of the sheet grippers grips the leading end of the sheet S (in other words, a downstream end of the sheet S in a sheet conveyance direction). The air suction unit 11 is disposed within an inner loop of the sheet carrying drum 10. A plurality of dispersed suction holes is formed on the surface of the sheet carrying drum 10. The air suction unit 11 sucks air to generate a negative pressure, so that a suction airflow directed to the interior of the sheet carrying drum 10 is generated in each of the plurality of dispersed suction holes.

The ink discharge unit 12 is disposed facing (opposing) the surface of the sheet carrying drum 10. The ink discharge unit 12 is configured to discharge inks of four colors of cyan (C), magenta (M), yellow (Y), and black (K). The ink discharge unit 12 includes individual ink discharge heads 12K, 12Y, 12M, and 12C for each of the four color inks. The ink discharge heads 12K, 12Y, 12M, and 12C are controlled to discharge the respective inks of four colors toward the surface of the sheet carrying drum 10.

According to this configuration, after the sheet S has been fed out from the sheet conveying device 1 to the sheet carrying drum 10, while the sheet gripper of the receiving cylinder 8 grips the leading end of the sheet S, the sheet S is conveyed to the sheet carrying drum 10 as the receiving cylinder 8 rotates. After the sheet S has been conveyed to the sheet carrying drum 10, the sheet gripper of the sheet carrying drum 10 grips the leading end of the sheet S. At this time, the suction airflow described above is generated on the circumferential surface of the sheet carrying drum 10 (specifically, on the plurality of suction holes in the circumferential surface of the sheet carrying drum 10). According to this configuration, while being attracted by suction airflow on (the plurality of suction holes of) the circumferential surface of the sheet carrying drum 10, the sheet S is conveyed as the sheet carrying drum 10 rotates (in other words, as the circumferential surface of the sheet carrying drum 10 moves).

While the sheet S is conveyed along (the plurality of suction holes of) the surface of the sheet carrying drum 10, the ink discharge heads 12K, 12Y, 12M, and 12C are controlled. Respective inks are discharged from the ink discharge heads 12K, 12Y, 12M, and 12C toward the surface of the sheet S. According to this ink discharge, an image corresponding to previously set image information is formed on the surface of the sheet S. Thereafter, the leading end of the sheet S reaches the transfer cylinder 9. At this time, the transfer cylinder 9 is driven at a given timing set in advance. Thus, the sheet S is conveyed to the drying device 4 along with movement of the surface of the transfer cylinder 9 while the leading end of the sheet S is gripped by the transfer cylinder 9.

The drying device 4 includes a conveyance unit 13 and a drying unit 14. According to this configuration, the sheet S conveyed to the drying device 4 is dried by the drying unit 14 while being conveyed by the conveyance unit 13. After the drying operation is performed, the sheet S is conveyed to the sheet ejecting device 5. During this sheet conveyance, curling (deformation due to curvature) of the sheet S is prevented. The sheets S conveyed from the drying device 4 are sequentially collected and stored in the sheet ejection tray St.

Figure 2:
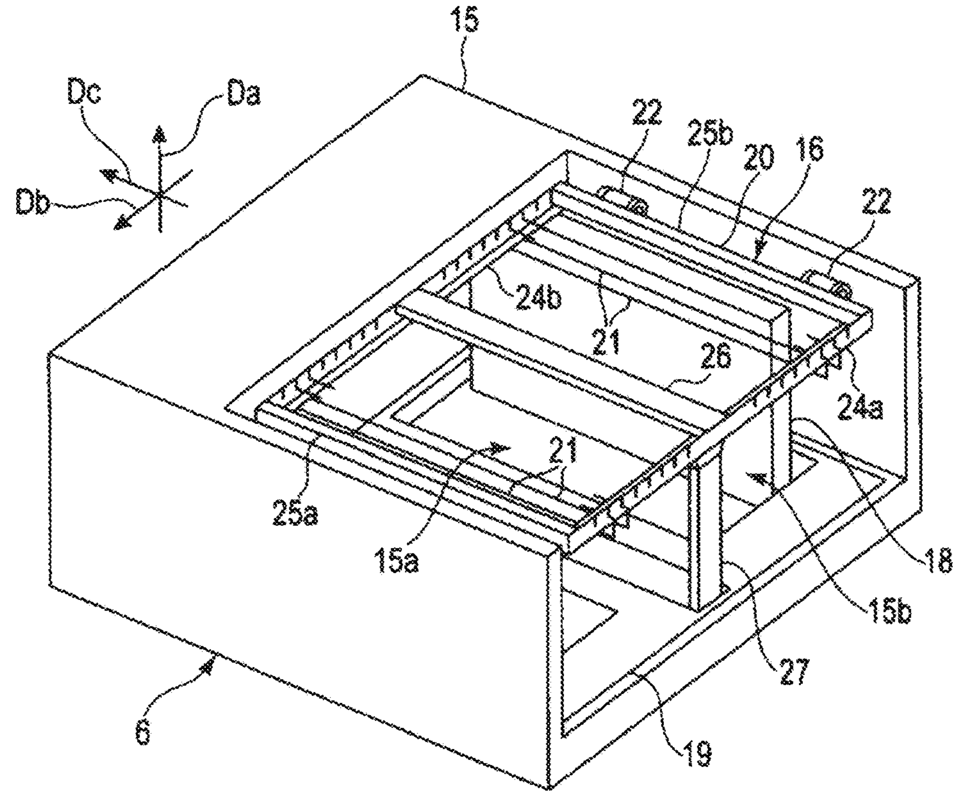
FIG. 2 is a perspective view of a sheet feeding unit according to an embodiment of the present disclosure.

FIG. 2 is a perspective view illustrating the configuration of the sheet feeding unit 6 provided to the image forming system 2. In FIG. 2, a vertical direction Da, a width direction Db, and a sheet conveyance direction Dc of the sheet feeding unit 6 are defined. These directions have the relation in positions that any two directions are perpendicular to each other. As illustrated in FIG. 2, the sheet feeding unit 6 includes a feeder housing 15, a guide mechanism 16, and a sheet feeding mechanism 17 (see FIG. 5).

The feeder housing 15 serving as a sheet stacker includes a sheet set opening 15*a* and a sheet containing portion 15*b*.

The sheet set opening 15*a* is open at an upper side of the feeder housing 15 when viewed from the vertical direction Da and an upstream side (trailing end) of the feeder housing 15 when viewed from the sheet conveyance direction Dc, penetrating the top side and the upstream side (trailing end) mutually in a rectangular shape. The sheet containing portion 15*b* receives the plurality of sheets S from the sheet set opening 15*a*. In other words, the plurality of sheets S are inserted into the feeder housing 15 through the sheet set opening 15*a*. A pair of side walls 18 and a sheet tray 19 are provided in the sheet containing portion 15*b*.

The guide mechanism 16 is rotatably disposed with respect to the feeder housing 15. When the sheet S is conveyed, the guide mechanism 16 prevents the rise of the uppermost sheet S1 (see FIG. 1) that is a conveyance target object of the plurality of sheets S accommodated in the sheet containing portion 15*b* and guides the uppermost sheet S1 (conveyance target object) in the sheet conveyance direction Dc. The above-described sheet tray 19 is configured to move upward and downward in the vertical direction Da. Among the plurality of sheets S accommodated in the sheet containing portion 15*b*, the uppermost sheet S1 of the sheets is constantly positioned to a constant position that is set in advance (for example, a sheet conveyance start position).

The guide mechanism 16 includes a frame 20 and guides 21. The frame 20 has a hollowed rectangular shape and is coupled to the feeder housing 15 (the sheet feeding unit 6) via two hinges 22 serving as a hinge mechanism. The frame 20 is disposed so as to cover the upper side of the sheet set opening 15*a* (sheet containing portion 15*b*) described above. The two hinges 22 are interposed between one side of the frame 20 (a second connecting portion 25*b* described below) and the feeder housing 15.

Figure 3:
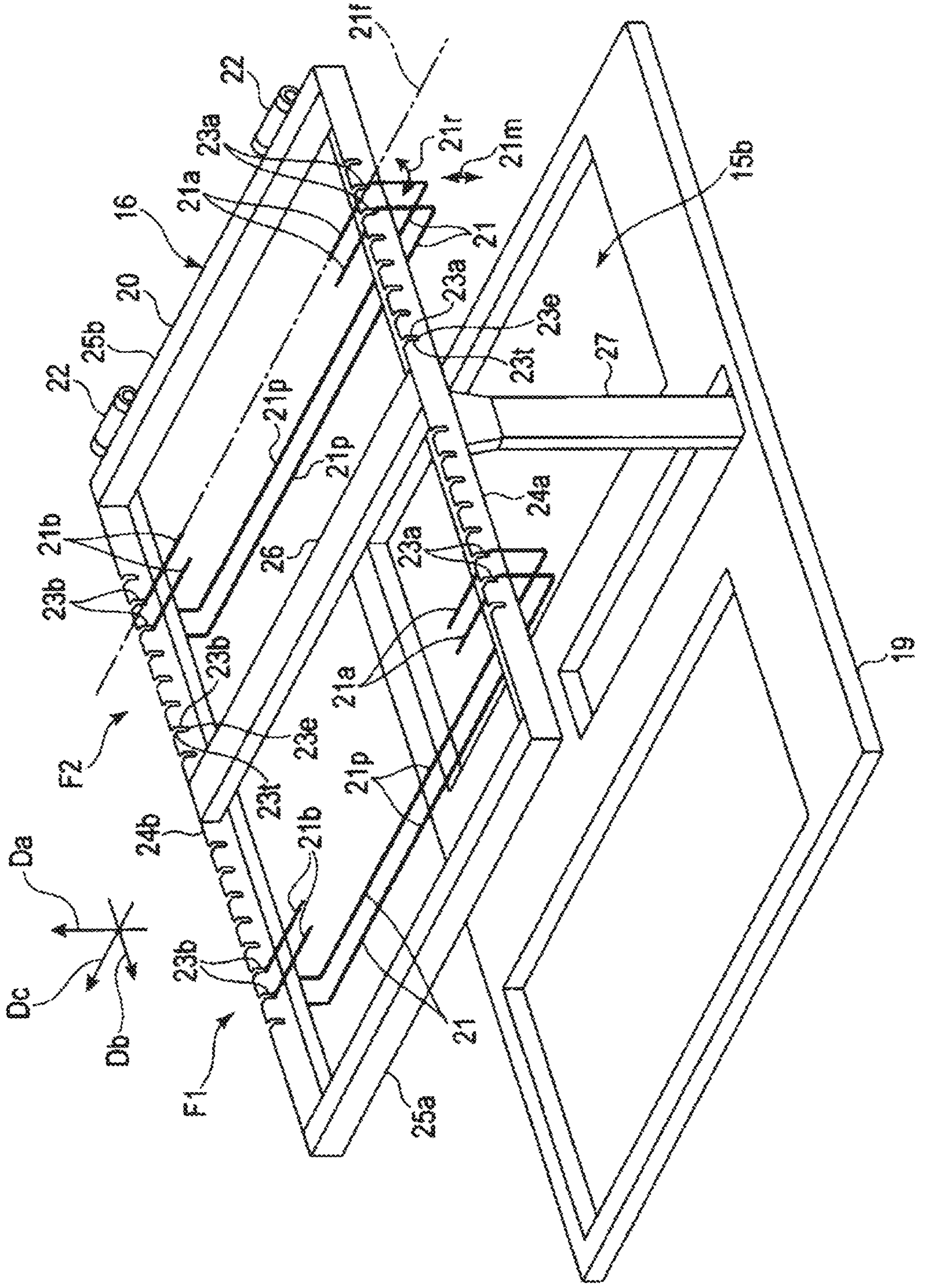
FIG. 3 is an enlarged perspective view of a main part of a guide mechanism included in the sheet feeding unit.

FIG. 3 is an enlarged perspective view illustrating the main part of the guide mechanism 16 (for example, the frame 20, the guides 21, and receiving portions 23*a* and 23*b*). The frame 20 includes two supports (i.e., a first support 24*a* and a second support 24*b*), two connecting portions (i.e., a first connecting portion 25*a* and the second connecting portion 25*b*), and a reinforcement member 26.

The first support 24*a* is disposed on the upstream side in the sheet conveyance direction Dc. The second support 24*b* is disposed on the downstream side in the sheet conveyance direction Dc. Specifically, the first support 24*a* is disposed upstream from the second support 24*b* in the sheet conveyance direction Dc (in other words, the second support 24*b* is disposed downstream from the first support 24*a* in the sheet conveyance direction Dc). The first support 24*a* and the second support 24*b* are disposed extending in the width direction Db and facing each other in parallel in the sheet conveyance direction Dc. The first support 24*a* and the second support 24*b* have both ends (in other words, one end and an opposed end) and have shapes identical to each other with the same dimension (lengths).

The two connecting portions, which are the first connecting portion 25*a* and the second connecting portion 25*b*, are disposed between the first support 24*a* and the second support 24*b*. The first connecting portion 25*a* is mutually connected to one end of the first support 24*a* and one end of the second support 24*b*. The second connecting portion 25*b* is mutually connected to the opposed end of the first support 24*a* and the opposed end of the second support 24*b*. The first connecting portion 25*a* and the second connecting portion 25*b* are disposed extending in the sheet conveyance direction Dc and facing each other in parallel in the width direction Db. The first connecting portion 25*a* and the second connecting portion 25*b* are mutually set to have the same dimensions (lengths) and the same shapes.

The reinforcement member 26 is disposed between the first connecting portion 25*a* and the second connecting portion 25*b*. In other words, the reinforcement member 26 is disposed at a position where the first support 24*a* and the second support 24*b* are divided into two equal parts in the width direction Db and extend along the sheet conveyance direction Dc. An end fence 27 is disposed on the reinforcement member 26 (the frame 20). One end of the end fence 27 is supported by the reinforcement member 26 and the opposed end of the end fence 27 extends downward along the vertical direction Da. The end fence 27 is configured to reciprocate along the reinforcement member 26. The end fence 27 is moved while the plurality of sheets S is accommodated in the sheet containing portion 15*b*. Due to such a configuration, the trailing end of the sheet S (the upstream side end in the sheet conveyance direction Dc) is aligned by the end fence 27.

Further, the frame 20 includes a plurality of receiving portions (i.e., first receiving portions 23*a* and second receiving portions 23*b*). The first receiving portions 23*a* and the second receiving portions 23*b* that functions as a plurality of receiving portions support the guides 21 to be detachably attachable to the frame 20. The first receiving portions 23*a* are a plurality of receiving portions disposed along the first support 24*a*. The second receiving portions 23*b* are a plurality of receiving portions disposed along the second support 24*b*. Both receiving portions, i.e., the first receiving portions 23*a* and the second receiving portions 23*b*, are disposed along the width direction Db that intersects the sheet conveyance direction Dc. In FIG. 3, as an example, on both sides (i.e., a first side F1 and a second side F2) of the reinforcement member 26, the first receiving portions 23*a* and the second receiving portions 23*b* are set to the equal number and arranged at equal intervals to each other. In other words, the number of the first receiving portions 23*a* is identical to the number of the second receiving portions 23*b*, the first receiving portions 23*a* are disposed at equal intervals, and the second receiving portions 23*b* are disposed at equal intervals.

The first receiving portions 23*a* and the second receiving portions 23*b* are aligned along the sheet conveyance direction Dc and disposed facing each other. The guides 21 (for example, hooks 21*a* and 21*b*) are placed on the two receiving portions 23*a* and the two receiving portions 23*b* aligned each other along the sheet conveyance direction Dc. As a result, the guides 21 are disposed along the sheet conveyance direction Dc.

The first receiving portions 23*a* and the second receiving portions 23*b* share the same shape and size. Each of the first receiving portions 23*a* has a recessed shape vertically recessed from the upper end to the lower end of a part of the first support 24*a*, as viewed in the vertical direction Da. Similarly, each of the second receiving portions 23*b* has a recessed shape vertically recessed from the upper end to the lower end of a part of the second support 24*b*, as viewed in the vertical direction Da. Each of the receiving portions, i.e., the first receiving portions 23*a* and the second receiving portions 23*b*, has an upper end 23*t* that is open and a lower end 23*e* that is closed, as viewed in the vertical direction Da.

According to this configuration, the guides 21 (the hooks 21*a* and 21*b*) are inserted from the upper end 23*t* that is open, to the first receiving portions 23*a* and the second receiving portions 23*b*. Accordingly, the guides 21 (the hooks 21*a* and 21*b*) are placed on the lower end 23*e* that is closed while being in contact with the lower end 23*e*. As a result, the guides 21 are supported by the frame 20 via the first receiving portions 23*a* and the second receiving portions 23*b*.

Further, the first receiving portions 23*a* and the second receiving portions 23*b*, each having a recessed shape, are bent at the upper end 23*t* side (the opening side). In FIG. 3, as an example, the upper end 23*t* side (the opening side) of the first receiving portions 23*a* and the second receiving portions 23*b* are bent in a direction separating from the hinges 22 (the second connecting portion 25*b*). In other words, the upper end 23*t* side (the opening side) of the first receiving portions 23*a* and the second receiving portions 23*b* are bent in a direction approaching the first connecting portion 25*a*.

According to this configuration, the frame 20 is rotated via the hinges 22. For example, the frame 20 is rotated so as to open the sheet set opening 15*a* (the sheet containing portion 15*b*). While the frame 20 is being rotated, the guides 21 (the hooks 21*a* and 21*b*) do not climb over the bent upper end 23*t* (the opening side). That is, the guides 21 (the hooks 21*a* and 21*b*) are supported by the first receiving portions 23*a* and the second receiving portions 23*b*. Accordingly, the guides 21 (the hooks 21*a* and 21*b*) do not come out of (drop from) the first receiving portions 23*a* and the second receiving portions 23*b*. As a result, the guides 21 are constantly supported by the frame 20 via the first receiving portions 23*a* and the second receiving portions 23*b*.

Each of the guides 21 has a sheet contact portion 21*p* and the hooks (i.e., the first hook 21*a* and the second hook 21*b*). In the example illustrated in FIG. 3, the sheet contact portion 21*p* has a long straight line shape extending straight. The sheet contact portion 21*p* is extended having a columnar shape with a circular cross section. The diameter of the sheet contact portion 21*p* is set to be equal (constant) over the entire length of the sheet contact portion 21*p*. Further, the hooks (the first hook 21*a* and the second hook 21*b*) are provided at both ends. In other words, the first hook 21*a* is provided at one end of the sheet contact portion 21*p* and the second hook 21*b* is provided at the opposed end of the sheet contact portion 21*p*.

The length of each of the guides 21 (that is, the sheet contact portion 21*p*) is set in correspondence with the length (along the sheet conveyance direction Dc) of the sheet S stored in the sheet containing portion 15*b*. Specifically, the entire length of the sheet contact portion 21*p* is set to contact throughout the entire length of the surface of the uppermost sheet S1, which serves as a conveyance target object, from an upstream area are (i.e., the trailing end of the uppermost sheet S1) to a downstream area (i.e., the leading end of the uppermost sheet S1) in the sheet conveyance direction Dc. Here, the term "upstream area" is a concept including an area between the trailing end of the uppermost sheet S1 in the sheet conveyance direction Dc and the center of the uppermost sheet S1, and the term "downstream area" is a concept including an area between the leading end of the uppermost sheet S1 and the center of the uppermost sheet S1 in the sheet conveyance direction Dc. Note that, instead of the configuration according to the present embodiment, each guide 21 may be set to contact the uppermost sheet S1, serving as a conveyance target object of the plurality of sheets S accommodated in the sheet containing portion 15*b*, from the upstream area to the center of the uppermost sheet S1 in the sheet conveyance direction Dc.

Each of the first hooks 21*a* is integrated with the one end of the sheet contact portion 21*p*. Further, each of the first hooks 21*a* is bent toward the opposed end (i.e., the corresponding opposed one of the second hooks 21*b*) of the sheet contact portion 21*p*. On the other hand, each of the second hooks 21*b* is integrated with the opposed end of the sheet contact portion 21*p*. Each of the second hooks 21*b* is bent toward the opposed end (i.e., the corresponding opposed one of the first hooks 21*a*) of the sheet contact portion 21*p*. The first hooks 21*a* and the second hooks 21*b* are set to have the same shape and diameter.

According to this configuration, any of the first hooks 21*a* is inserted into (placed onto) a corresponding one of the first receiving portions 23*a* of the first support 24*a* and, at the same time, any of the second hooks 21*b* is inserted into (placed onto) a corresponding one of the second receiving portions 23*b* of the second support 24*b*. Accordingly, the sheet contact portion 21*p* is supported by the first support 24*a* and the second support 24*b* via the first hook 21*a* and the second hook 21*b*, respectively. As a result, the guide 21 is supported by the frame 20. In other words, the guide 21 is suspended by the first receiving portion 23*a* the second receiving portion 23*b*.

In the above-described state, the guide 21 maintains the posture in which the guide 21 hangs down with the own weight along the vertical direction Da (also referred to as the direction of gravitational force). In other words, the guide 21 maintains the posture in which the sheet contact portion 21*p* is positioned immediately below the first hook 21*a* and the second hook 21*b*, when viewed from the direction of gravitational force. At this time, the guide 21 (specifically, the sheet contact portion 21*p*) is disposed parallel to the surface of the sheet S1 that is one of the uppermost sheets (that is, the sheet S1 as a conveyance target object) of the plurality of sheets S stored in the sheet containing portion 15*b* and is disposed parallel to the sheet conveyance direction Dc.

As an example illustrated in FIG. 3, two guides 21 are supported at symmetrical positions of both sides (i.e., the first side F1 and the second side F2) of the reinforcement member 26, when viewed from the width direction Db. The guides 21 are maintained in respective attitudes in which the sheet contact portion 21*p* is positioned immediately below the first hook 21*a* and the second hook 21*b*, by the own weights of the guides 21. The respective guides 21 are changeable in positions (positional change) by rotational motion 21*r* and reciprocating motion 21*m* to reduce frictional resistance (load resistance) between the sheet contact portion 21*p* of the guide 21 and the sheet S. Such positional change (i.e., movement of each of the guides 21 by rotational motion 21*r* and reciprocating motion 21*m*) may occur according to a contact state between the guide 21 and the uppermost sheet S1 (conveyance target object) separated from the subsequent sheet S2, for example, when the uppermost sheet S1 is fed from the sheet feeding unit 6 (at sheet feeding).

The rotational motion 21*r* of the guide 21 is assumed, for example, to be a rotational motion rotating about a virtual axis 21*f* extending along the sheet conveyance direction Dc (for example, an axis extending both the first hook 21*a* and the second hook 21*b* in the sheet conveyance direction Dc). The reciprocating motion 21*m* of the guide 21 is assumed, for example, to be a reciprocating motion moving, at sheet feeding, along a direction in which the uppermost sheet S1 (conveyance target object) separates from the subsequent sheet S2 in the sheet feeding unit 6 (in other words, along a thickness direction intersecting or perpendicular to the surface of the uppermost sheet S1). In this case, the reciprocating motion 21*m* of the guides 21 corresponds to a reciprocating motion in which the sheet contact portion 21*p* lifts or lowers, viewed in the vertical direction Da, when the first hooks 21*a* and the second hooks 21*b* rotate about the virtual axis 21*f* (the line of axis).

To be more specific, the positional change of each of the guides 21 (movement of each of the guides 21 by the rotational motion 21*r* or the reciprocating motion 21*m*) described above is likely to occur depending on types (for example, the thickness and the weight) of the uppermost sheet S1 (conveyance target object). For example, if the uppermost sheet S1 functioning as a conveyance target object is a lightweight, thin sheet, the position of the guide 21 in contact with the uppermost sheet S1 does not change. In other words, since the pressing force from the lightweight, thin sheet S1 applies small pressing force to the guide 21, the guide 21 is maintained in the initial hanging posture without changing the position. By contrast, if the uppermost sheet S1 functioning as a conveyance target object is a heavyweight, thick sheet, the position of the guide 21 in contact with the uppermost sheet S1 changes. In other words, since the pressing force from the heavyweight, thick sheet S1 applies large pressing force to the guide 21, the guide 21 performs the rotational motion 21*r* about the virtual axis 21*f* or the reciprocating motion 21*m* along the thickness direction.

When a plurality of sheets S are inserted into the sheet containing portion 15*b* of the sheet feeding unit 6, the sheet feeding unit 6 is pulled out from the housing 1*p* of the sheet conveying device 1. The frame 20 is rotated via the hinges 22 while supporting the four guides 21. In this state, the plurality of sheets S are inserted. After the insertion, the frame 20 is reversely rotated to return the sheet feeding unit 6 to a housing 1*p* of the sheet conveying device 1.

Figure 4:
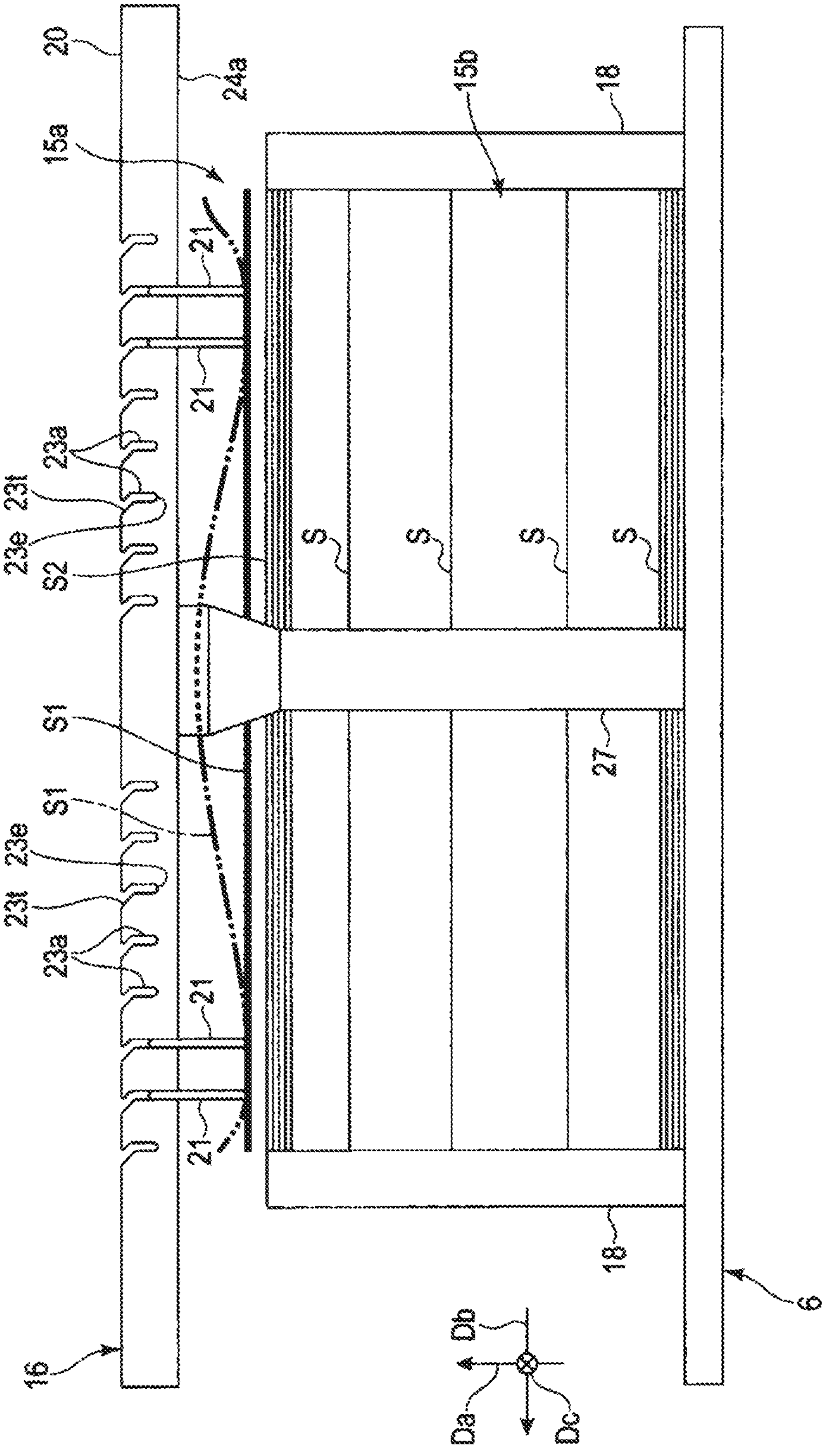
FIG. 4 is an end view of the sheet feeding unit included in the sheet conveying device, viewed from an end fence.

FIG. 4 is a side view illustrating the sheet feeding unit 6 stored in the housing 1*p*, viewed from the end fence 27 side. As illustrated in FIG. 4, the plurality of sheets S that has been inserted in the sheet containing portion 15*b* of the sheet feeding unit 6 is stacked and stored between the pair of side walls 18 on the sheet tray 19. In this state, the sheet feeding mechanism 17 is operated. Details of the sheet feeding mechanism 17 are described below. As a result, the uppermost sheet S1 (conveyance target object) is fed out from the sheet feeding unit 6.

Figure 5:
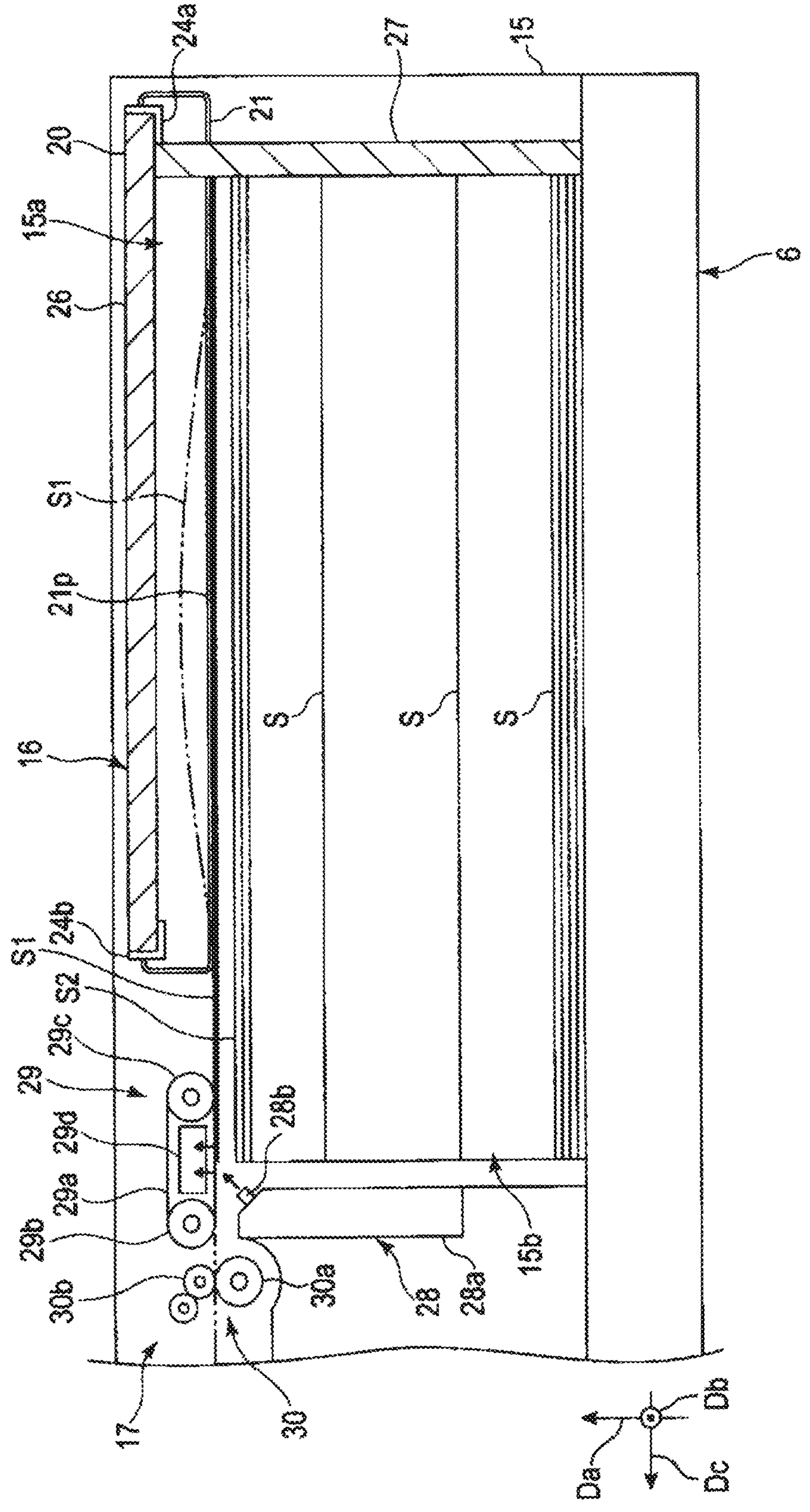
FIG. 5 is a side view of a configuration of a sheet feeding mechanism included in the sheet feeding unit.

FIG. 5 is a side view illustrating the sheet feeding mechanism 17 provided with the sheet feeding unit 6. As illustrated in FIG. 5, the sheet feeding mechanism 17 is disposed adjacent to the sheet containing portion 15*b* and on the downstream side (leading end) of the sheet S in the sheet conveyance direction Dc. In this case, the sheet feeding mechanism 17 includes an air blowing device 28 (also referred to as an air blower), an air suction device 29, and a group of sheet feed rollers 30. Note that the configuration of the sheet feeding mechanism 17 illustrated in FIG. 5 is an example configuration, and another configuration may be applied to the sheet feeding mechanism 17.

The air blowing device 28 functioning as an air blower includes a housing 28*a* and a nozzle 28*b*. The housing 28*a* supplies compressed air to the nozzle 28*b*. The nozzle 28*b* blows air supplied from the housing 28*a*. In the example of FIG. 5, the nozzle 28*b* blows air toward the uppermost sheet S1 at the sheet conveyance start position (i.e., the uppermost sheet S1 placed on top of the plurality of sheets S accommodated in the sheet containing portion 15*b*) and the subsequent sheet S2 near the uppermost sheet S1 of the plurality of sheets S.

The air suction device 29 includes an attraction belt 29*a* in a form of an endless loop, a pair of rollers including, for example, a drive roller 29*b* and a driven roller 29*c*, and an air suction unit 29*d*. The attraction belt 29*a* is wound around the pair of rollers, that is, the drive roller 29*b* and the driven roller 29*c*. The attraction belt 29*a* has a plurality of suction holes are scattered over the entire surface. The plurality of suction holes penetrate through the attraction belt 29*a* in the thickness direction. In this case, for example, as the drive roller 29*b* rotates, the attraction belt 29*a* is moved in the sheet conveyance direction.

The air suction unit 29*d* is disposed inside the loop of the attraction belt 29*a* and communicates with the pair of rollers, that is, the drive roller 29*b* and the driven roller 29*c*. The air suction unit 29*d* generates the negative pressure to the lower side of the attraction belt 29*a* (in other words, the area facing the uppermost sheet S1 of the plurality of sheets S accommodated in the sheet containing portion 15*b*), when viewed from the vertical direction Da. By generating the negative pressure to the lower side of the attraction belt 29*a*, suction airflow is generated from each suction hole toward the attraction belt 29*a*.

The group of sheet feed rollers 30 includes a pair of conveyance rollers (for example, conveyance rollers 30*a* and 30*b*). The pair of conveyance rollers, i.e., the conveyance rollers 30*a* and 30*b* in contact with each other rotate opposite to each other. By so doing, the sheet S that has reached the pair of conveyance rollers including the conveyance rollers 30*a* and 30*b* is conveyed toward the registration roller pair 7 (see FIG. 1).

According to this configuration, for example, while the attraction belt 29*a* is moving, the negative pressure is generated to the lower side of the attraction belt 29*a*. During the above-described action, air is blown from the nozzle 28*b* to the sheet S1 at the sheet conveyance start position and the sheets S2 near the sheet S1 and the plurality of sheets S. By so doing, the sheet S1 of the uppermost sheets of the plurality of sheets S contained in the sheet containing portion 15*b* (in other words, the sheet S1 serving as a conveyance target) is separated from the other sheet S2 to float. Thus, the leading end side of the sheet S1 serving as a conveyance target is attracted to the attraction belt 29*a*.

In this state, the attraction belt 29*a* is moved. With the movement of the attraction belt 29*a*, the sheet S1 serving as a conveyance target is fed out toward the group of sheet feed rollers 30. Consequently, the leading end side of the sheet S1 functioning as a conveyance target object reaches the pair of conveyance rollers (for example, the conveyance rollers 30*a* and 30*b*). At this time, the conveyance rollers 30*a* and 30*b* are rotated. As a result, the sheet S1 serving as a conveyance target object is conveyed to the image forming apparatus 3 via the registration roller pair 7 described above.

According to the present embodiment, the guide mechanism 16 includes the guides 21 that contact the surface of the uppermost sheet S1 (conveyance target object) over the area from the upstream area to the downstream area in the sheet conveyance direction Dc to guide the uppermost sheet S1. In this case, the uppermost sheet S1 (conveyance target object) is guided by the guides 21 while contacting over the given area from upstream to downstream of the uppermost sheet S1, when viewed from the sheet conveyance direction Dc. Due to such a configuration, the uppermost sheet S1 (conveyance target object) is prevented from rising as indicated by broken lines in FIGS. 4 and 5. In other words, this configuration prevents rise of the uppermost sheet S1 (conveyance target object) in the upstream area of the uppermost sheet S1 (i.e., the trailing end of the uppermost sheet S1) and in the downstream area that is downstream from the upstream area in the sheet conveyance direction Dc, simultaneously. As a result, jam or paper jam caused by conveyance failure of the uppermost sheet S1 is prevented before occurring.

It is preferable that the guides 21 guide the uppermost sheet S1 while contacting the surface of the uppermost sheet S1 over an area from at least the upstream area to the center of the uppermost sheet S1 in the sheet conveyance direction Dc. It is more preferable that the above-described given area is the downstream area of the uppermost sheet S1 (i.e., the leading end of the uppermost sheet S1) in the sheet conveyance direction Dc. It is much more preferable that the guides 21 are provided further upstream of the uppermost sheet S1 in the sheet conveyance direction Dc from the trailing end (the end of the upstream side) of the uppermost sheet S1 in the sheet conveyance direction Dc.

Further, it is preferable that the guides 21 are parallel to the surface of the uppermost sheet S1 accommodated in the sheet containing portion 15*b* and parallel to the sheet conveyance direction Dc of the uppermost sheet S1. As a result, while maintaining the posture of the uppermost sheet S1 rising by air blown by the air blowing device 28, the uppermost sheet S1 is conveyed toward a downstream sheet conveyance passage in which the group of sheet feed rollers 30 is disposed, without causing skew or other failure.

The guide mechanism 16 described above has functions capable of changing the position to cause the guide 21 to change the position of the guide 21 with the rotational motion 21*r* and the reciprocating motion 21*m*. In this case, when each guide 21 performs the rotational motion 21*r*, the sheet contact portion 21*p* rotates about the virtual axis 21*f*. Further, when each guide 21 performs the reciprocating motion 21*m*, the sheet contact portion 21*p* moves vertically, when viewed from the vertical direction Da. By so doing, the uppermost sheet S1 (conveyance target object) is separated from the subsequent sheet S2 by an optimal distance, so that the uppermost sheet S1 is held at a position to be conveyed easily and is positioned parallel to the sheet conveyance direction Dc. As a result, the uppermost sheet S1 separated by air from the subsequent sheet S2 is significantly enhanced in the conveyance accuracy or conveyance stability.

In the above-described guide mechanism 16, as described below, there is room for improvement in the guide performance when sheets having various levels of stiffness are used. That is, as described above, the guide 21 in contact with the uppermost sheet S1 is displaced depending on whether the uppermost sheet S1 to be conveyed is a thick sheet. However, depending on various setting conditions, the friction force with the guide 21 is too large in the uppermost sheet S1 being a thick sheet, and non-feeding occurs in which the sheet is not conveyed. In order to avoid this failure, it is conceivable to set the condition so that the friction force is not too large even when the uppermost sheet S1 is thick. However, in such a case, a sufficient floating prevention function is not achieved when the uppermost sheet S1 is thin, and the double feeding due to the separation failure may occur. As described above, there is room for improvement in the guide performance of favorably guiding a sheet while preventing floating.

Figure 6A:
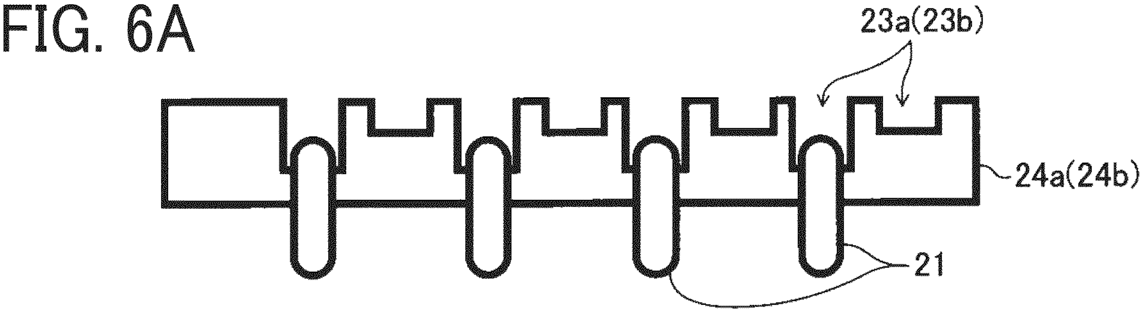
FIGS. 6A, 6B, 6C, and 6D are diagrams illustrating a configuration example of a guide mechanism according to an embodiment of the present disclosure.
Figure 6B:
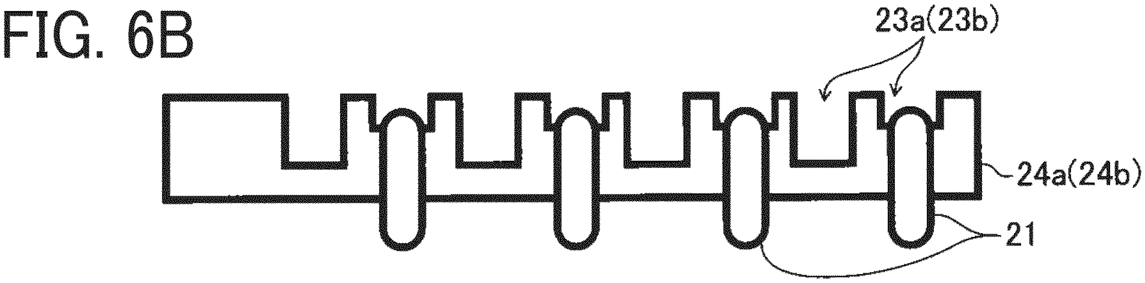
Figure 6C:
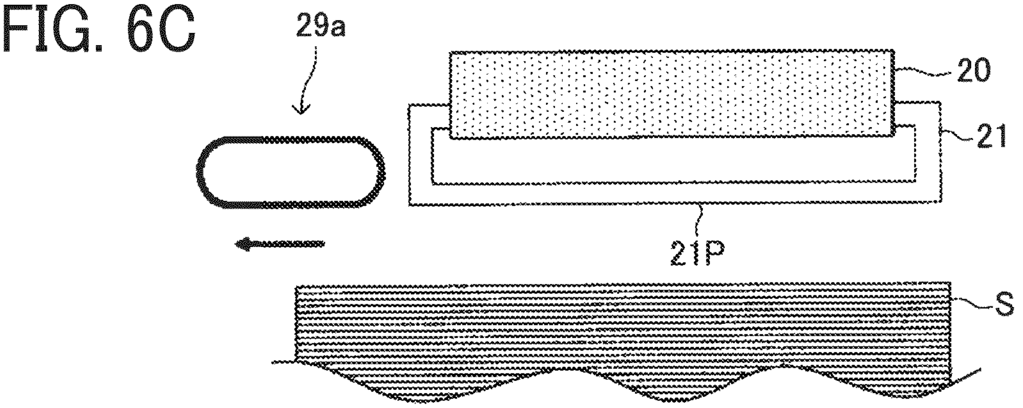

For this reason, in the present embodiment, the set height of the sheet contact portion 21*p* in the guide 21 can be changed. FIGS. 6A, 6B, 6C, and 6D are diagrams illustrating a configuration example of the sheet contact portion 21*p* in the guide 21. As illustrated in FIGS. 6A and 6B, the receiving portions 23*a* and 23*b* of the first support 24*a* and the second support 24*b* are formed as grooves (groove-shaped portions) having different depths. For example, the grooves having different depths are formed in the support portion 24 so as to be adjacent to each other. FIG. 6A illustrates a state in which the hooks of the guides 21 are placed in deep grooves. When the guide 21 is made of a wire as a wire material, hooks bent short at both ends of the guide are hooked to grooves (cut portions of a support). In this case, as illustrated in FIG. 6C, the sheet contact portion 21*p* of the guide 21 has a relatively low set height.

The set height of the sheet contact portion 21*p* is a height taken by the sheet contact portion 21*p* in a natural state in which the sheet contact portion 21*p* is not pressed by a sheet. That is, the set height is a height of the sheet contact portion 21*p* in a state in which the sheet contact portion 21*p* is not displaced due to push-up of a sheet blown up by air.

As illustrated in FIGS. 6A and 6C, the relatively low set height of the sheet contact portion 21*p* is adopted when a thin paper sheet (thin sheet). The relation between the lower surface of the attraction belt 29*a* and the support in the example illustrated in FIG. 6C is an arrangement relation in which the distance from the sheet to the lower surface of the attraction belt 29*a* is equal to the distance from the sheet to the sheet contact portion 21*p*.

Figure 6D:
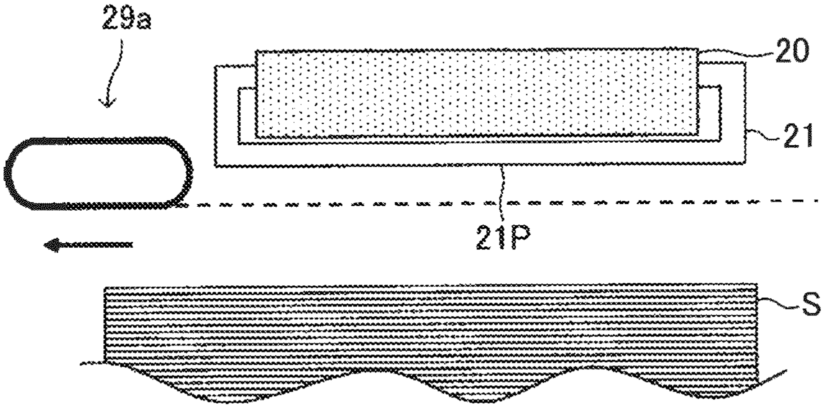

On the other hand, when the hooks of the guides 21 are placed in shallow grooves illustrated in FIG. 6B, the sheet contact portion 21*p* of each guide 21 has a relatively high set height as illustrated in FIG. 6D. Such a relatively high set height is adopted when a thick paper sheet (thick sheet) is conveyed. Regarding the relation between the lower surface of the attraction belt 29*a* and the support at the time of conveying a thick paper sheet, the distance from the sheet to the sheet contact portion 21*p* is set greater than the distance from the sheet to the attraction belt 29*a*. Thus, the height of the sheet contact portion 21*p* is set to a height at which the sheet hardly contacts or does not contact the sheet contact portion 21*p*. In the case of a thick paper sheet, such a configuration can prevent the guide 21 from acting as conveyance resistance and causing non-feeding of the sheet. If the set height of the sheet contact portion 21*p* is such a height that the sheet does not contact the sheet contact portion 21*p*, the same state can be obtained as the state in which the guide 21 is removed to prevent non-feeding of the sheet.

As described above, in the configuration example of FIGS. 6A to 6D, a plurality of grooves having different depths are provided as the receiving portions 23, and the grooves on which the guides 21 are placed are changed according to the sheet thickness. That is, the attachment positions of the guides 21 are changed. For example, in the case of a thin paper sheet, the attraction belt 29*a* and the sheet contact portion 21*p* are set at the same height to prevent the fluctuations of the sheet due to air by the guides 21. In the case of a thick paper sheet, the sheet contact portion 21*p* is set higher than the attraction belt 29*a* and is set at a position at which the sheet contact portion 21*p* does not contact the sheet, to eliminate the conveyance resistance.

Figure 7A:
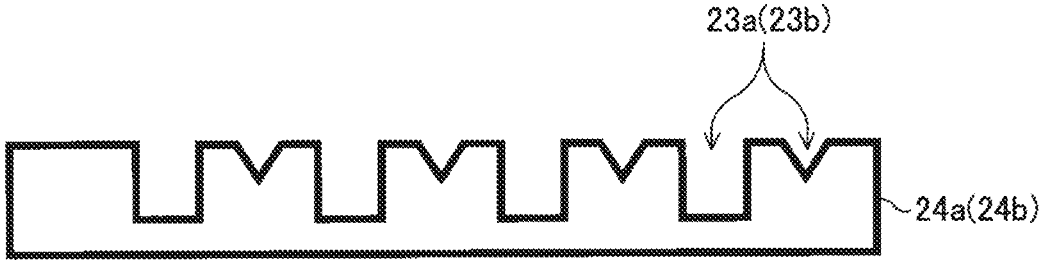
FIGS. 7A and 7B are diagrams illustrating modifications of the shape of grooves illustrated in FIGS. 6A and 6B.
Figure 7B:
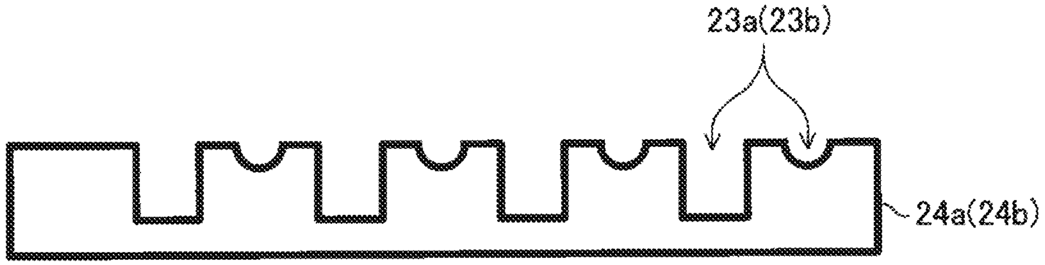

FIGS. 7A and 7B illustrates modifications of the shape of the grooves. The grooves in FIG. 6A are rectangular in cross section. Shallow grooves in FIG. 7A are triangular in cross section and shallow grooves in FIG. 7B are semicircular in cross section. In both FIG. 7A and FIG. 7B, the shallow grooves have different shapes from the rectangular shape of the shallow grooves illustrated in FIG. 6A. Note that in FIG. 7A and FIG. 7B, the deep grooves may also have a shape different from the rectangular shape.

FIGS. 8A, 8B, 8C, and 8D diagrams illustrating another configuration example in which the set height of the sheet contact portion 21*p* in the guide 21 can be changed. In this configuration example, the set height of the sheet contact portion can be changed depending on whether a plurality of guides extending in the sheet conveyance direction, a support that supports one of both ends of each guide in the sheet conveyance direction so as to be rotatable about a virtual axis extending along the conveyance direction, and lower end portions of a pair of adjacent guides are connected.

Figure 8A:
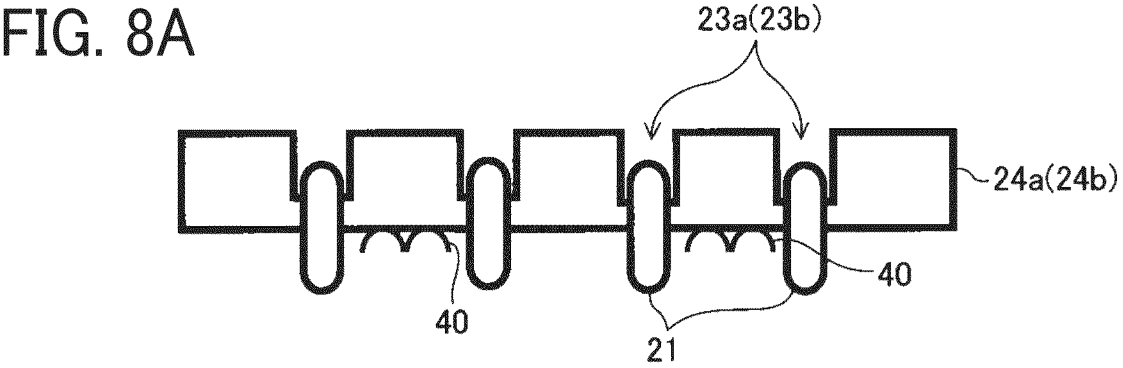
FIGS. 8A and 8B are diagrams illustrating a configuration example of a guide mechanism according to an embodiment of the present disclosure.
Figure 8B:
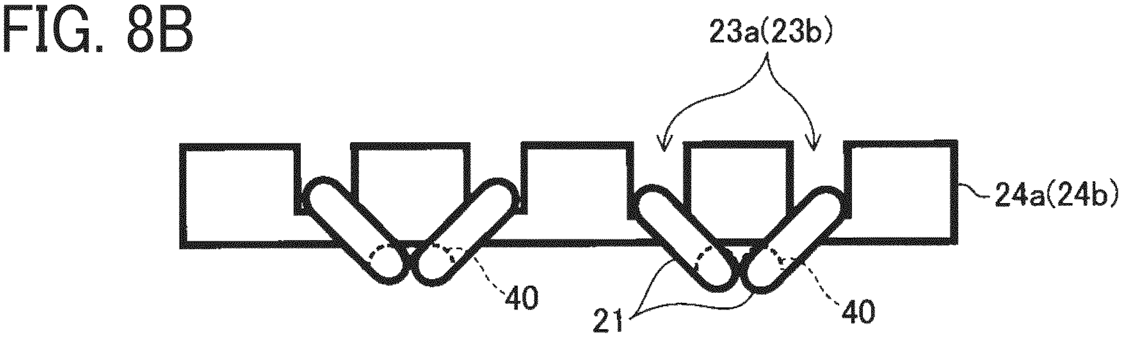

In FIGS. 8A and 8B, the lower end portions of two adjacent guides 21 are fastened at one position by a clip 40. A member other than the clip may be used as long as two adjacent guides 21 are connected. FIG. 8A illustrates a non-connected state, and FIG. 8B illustrates a connected state. In the connected state, the set height of the sheet contact portion 21*p* at the lower end portion of the guide 21 is high. This height is set to a height at which the conveyance resistance of the sheet is small or the sheet contact portion 21*p* does not contact the sheet at all. Although the clip 40 may be provided for each of the guides 21, connecting two of the guides 21 can reduce the number of clips 40, thus allowing cost reduction. The clip 40 is disposed on the lower surface of the support 24*a* (or 24*b*).

Figure 8C:
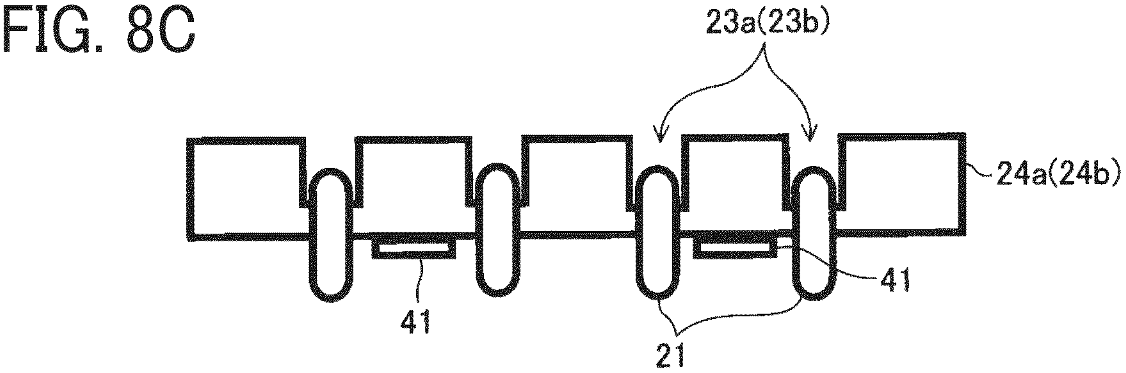
FIGS. 8C and 8D are diagrams illustrating a configuration example of a guide mechanism according to an embodiment of the present disclosure.
Figure 8D:
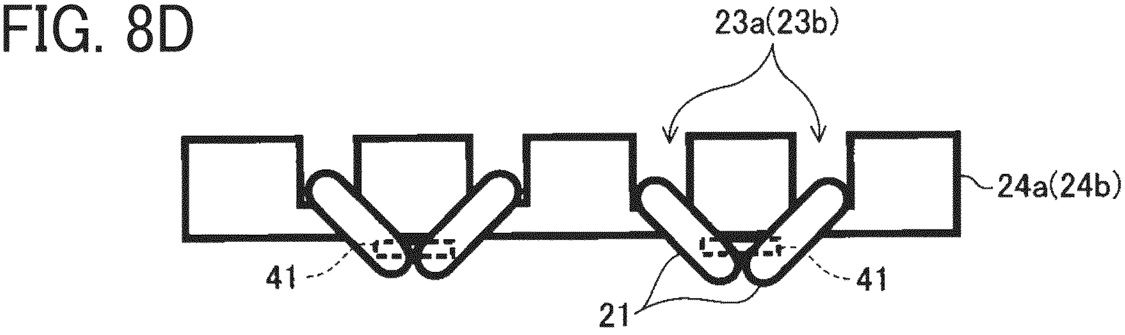

FIGS. 8C and 8D illustrate examples in which a magnet 41 is used to connect the lower end portions of two adjacent guides 21.

Figure 9A:
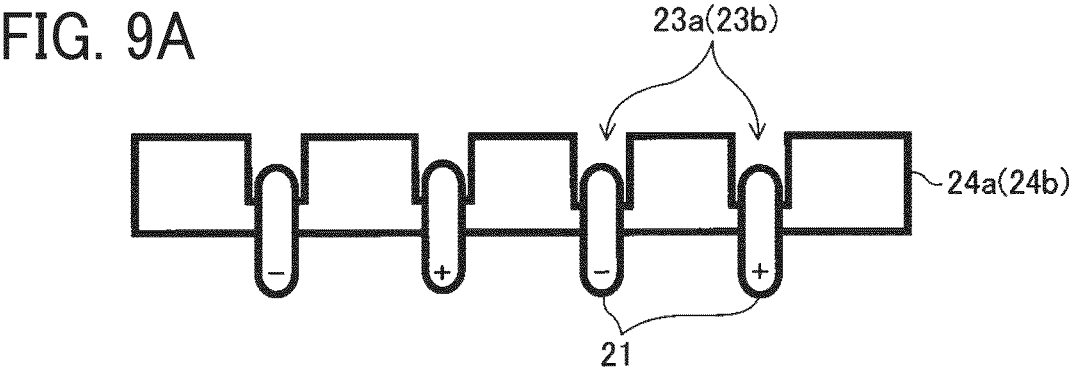
FIGS. 9A and 9B are diagrams illustrating a configuration example of a guide mechanism according to an embodiment of the present disclosure.
Figure 9B:
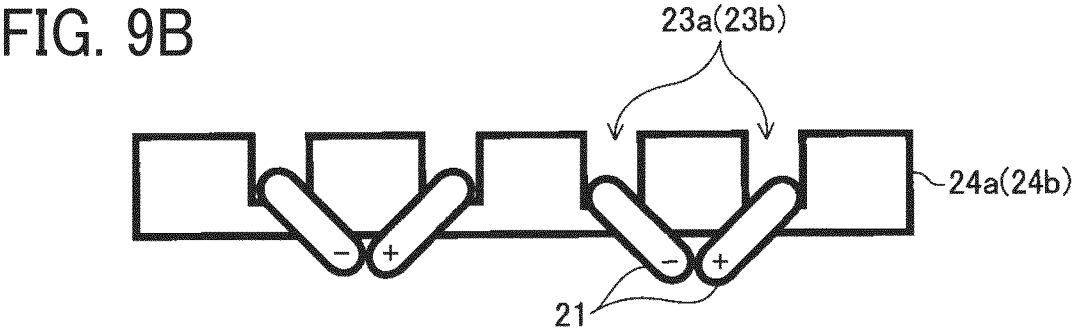

FIGS. 9A and 9B illustrate an example in which the lower end portions of the guides 21 adjacent to each other are magnetized to have different polarities. As illustrated in FIG. 9B, when the lower end portions are brought close to each other, the lower end portions are attracted and connected to each other.

Figure 9C:
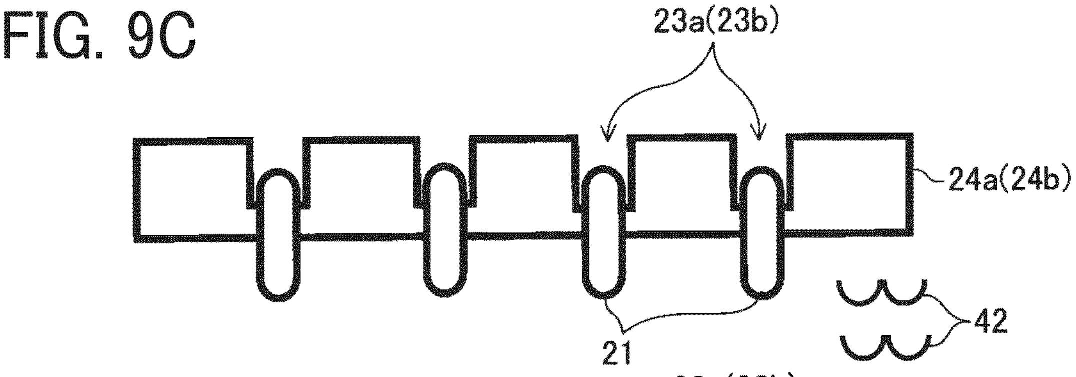
FIGS. 9C and 9D are diagrams illustrating a configuration example of a guide mechanism according to an embodiment of the present disclosure.
Figure 9D:
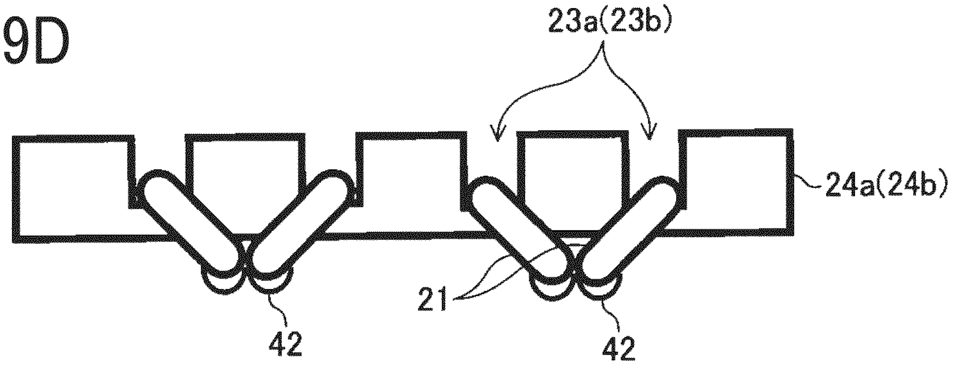

FIGS. 9C and 9D illustrate an example in which a clip 42 as a separate component from the support 24*a* or 24*b* is used to connect two adjacent guides 21. FIG. 9D illustrates a state in which two adjacent guides 21 are connected with the clip 42.

Figure 10:
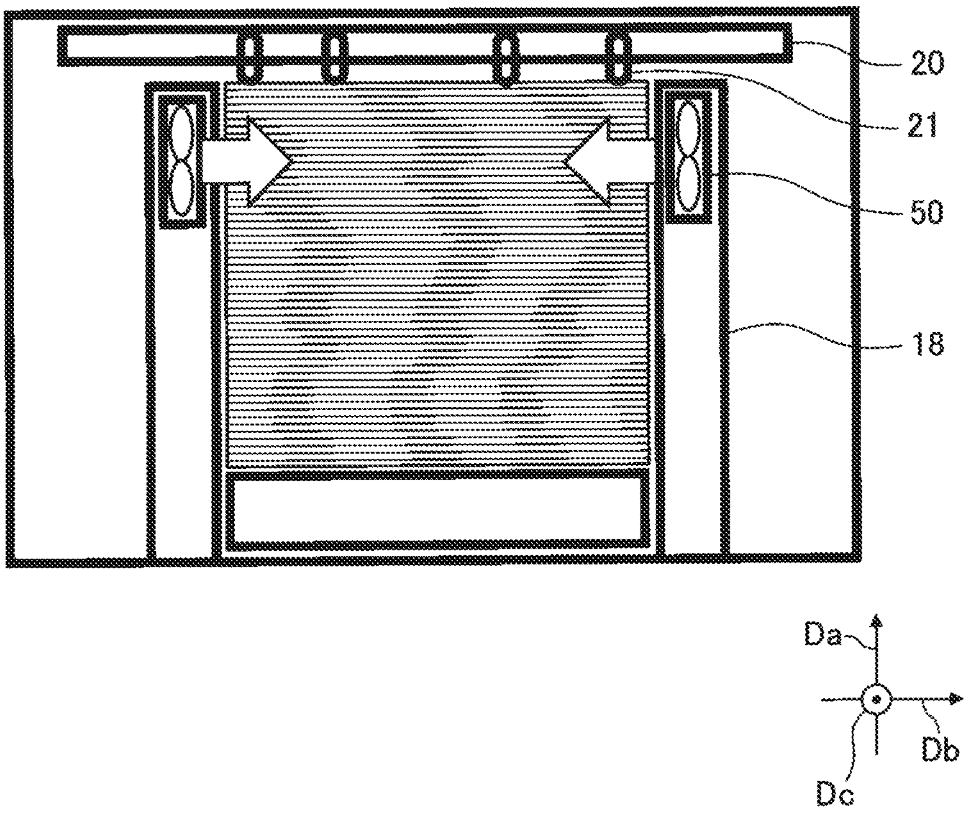
FIG. 10 is a diagram illustrating a modification of an air blowing device.

FIG. 10 is a diagram illustrating a modification of an air blowing device (air blower). In the example illustrated in FIG. 5, the air blowing device 50 is disposed on the downstream side (leading end side) in the sheet conveyance direction Dc of the sheet S. On the other hand, in the example illustrated in FIG. 10, air blowing devices 50 are disposed in side walls 18 to blow air from both sides of the sheet S in the width direction. In addition to the leading end side of the sheet in FIG. 5, air may be blown from both sides of the sheet in the width direction Db.

Figure 11A:
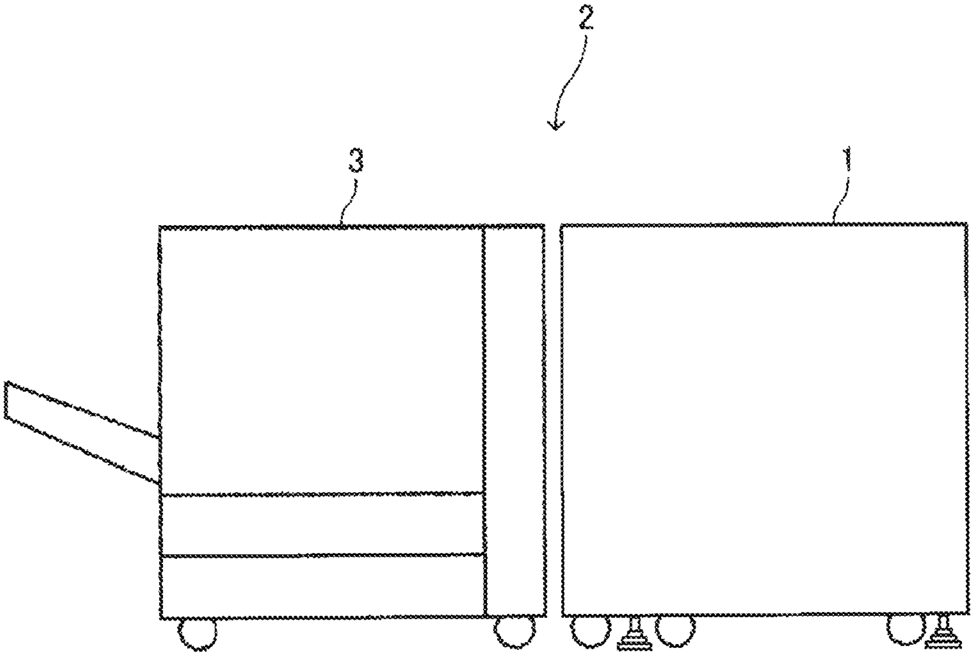
FIGS. 11A and 11B are diagrams illustrating an electrophotographic image forming system according to an embodiment of the present disclosure.
Figure 11B:
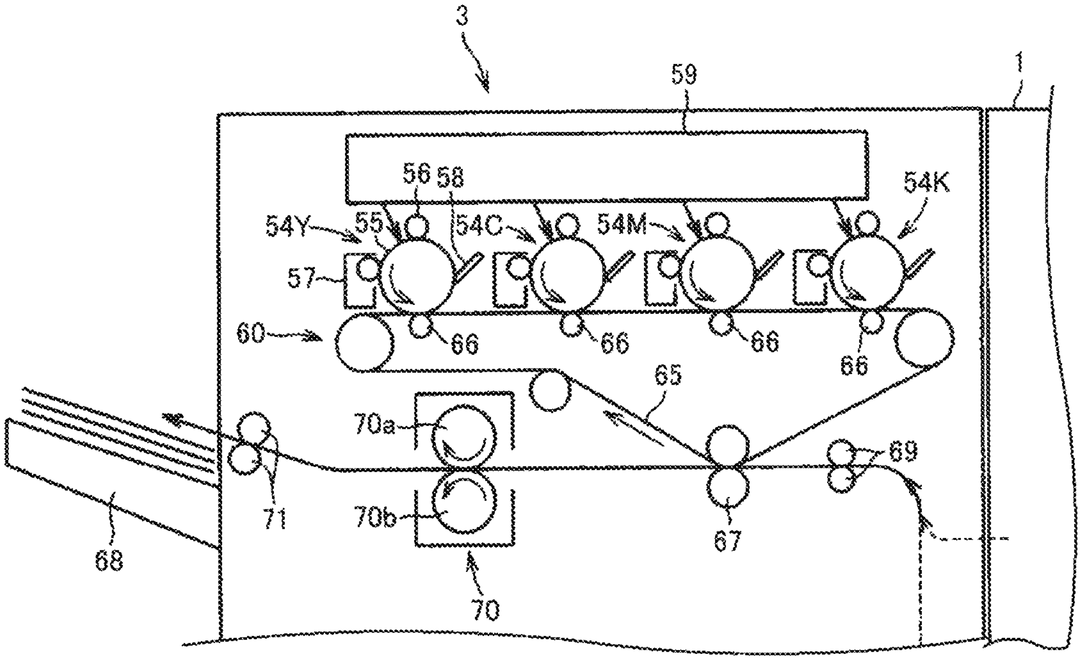

FIGS. 11A and 11B are diagrams illustrating an example of an electrophotographic image forming system that forms an image with toner. FIG. 11A is a schematic diagram of a configuration of an image forming system 2 including a sheet conveying device 1 and an image forming apparatus 3. FIG. 11B is a schematic diagram of an inner configuration of the image forming apparatus 3 of FIG. 11A. In FIG. 11B, the image forming apparatus 3 is a tandem-type color image forming apparatus of an intermediate transfer system in which four photoconductors are included in four image forming devices.

The image forming apparatus 3 is a tandem image forming apparatus in which a plurality of image forming devices 54Y, 54M, 54C, and 54K that correspond to yellow (Y), magenta (M), cyan (C), and black (K) colors, respectively, are arranged along the rotational direction of an intermediate transfer belt 65 that serves as an intermediate transferor. Each of the image forming devices 54Y, 54M, 54C, and 54K includes a photoconductor 55 serving as a latent-image bearer. Each of the image forming devices 54Y, 54M, 54C, and 54K includes a charging devices 56, an optical writing device 59, a developing device 57, a primary transfer device 66, and a cleaning device 58 around the photoconductor 55. The charging device 56 uniformly charges the surface of the photoconductor 55 to a predetermined potential. The optical writing device 59 serving as an electrostatic latent image forming device exposes the surface of the photoconductor uniformly charged by the charging device 56 according to image information to write an electrostatic latent image. The developing device 57 serving as a developing unit forms a toner image by a developing process in which toner of a corresponding color of Y, M, C, or K is attached to the electrostatic latent image on the photoconductor. The primary transfer device 66 serving as a primary transfer unit transfers the toner image of Y, M, C, or K on the photoconductor 55 onto the intermediate transfer belt 65. The cleaning devices 58 serving as a cleaner remove post-transfer residual toner on the photoconductor 55.

The color toner images of Y, M, C, and K that are formed on the photoconductors 55 of the image forming devices 54Y, 54M, 54C, and 54K are primarily transferred onto the intermediate transfer belt 65 by the primary transfer devices 66 in the primary transfer process so as to be superimposed on top of one another. As the intermediate transfer belt 65 rotates, the color toner image that is formed on the intermediate transfer belt 65 is conveyed to the opposing area where the intermediate transfer belt 65 and the secondary transfer device 67 face each other. The above opposing area may be referred to as a secondary transfer area in the following description.

On the other hand, a sheet feeding device is disposed in the lower part of the image forming apparatus 3. The sheet feeding device serves as a sheet feeder that feeds a sheet S to bear the color toner image. Accordingly, the sheet S is conveyed to the secondary transfer area through a conveyance roller pair 69 along the conveyance passage indicated by the broken lines in FIG. 11B.

The color toner image that is formed on the intermediate transfer belt 65 is transferred onto the sheet S, which is conveyed through the conveyance roller pair 69 at a predetermined timing, at the secondary transfer area by a secondary transfer device 67 in the secondary transfer process. The sheet S on which the color toner image is formed is then conveyed to a fixing device 70 that serves as a fixing unit, and heat and pressure are applied by a fixing roller 70*a* and a pressure roller 70*b*, respectively, to the sheet S to fix the color toner image onto the sheet S. The sheet S on which the color toner is fixed is conveyed along the conveyance passage indicated by the broken lines in FIG. 11B, then is ejected by a sheet ejection roller pair 71 to a sheet ejection tray 68 that serves as a sheet ejection unit.

Although FIGS. 1, 11A, and 11B illustrate an image forming system in which the sheet conveying device 1 and the image forming apparatus 3 are separated from each other, the sheet conveying device according to the present embodiment may be applied to an image forming system in which the sheet conveying device and an image forming apparatus are integrated with each other, that is, the sheet conveying device is incorporated in the housing of the image forming apparatus.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

What is claimed is:

1. A sheet conveying device comprising:

a sheet stacker to stack sheets;

an air blower to blow air to the sheets;

a guide to face an uppermost sheet on the sheet stacker; and a receiving portion to which the guide is attached, wherein a set height of a contact portion of the guide to contact the uppermost sheet is changeable, wherein an attachment position of the guide is changeable to change the set height, wherein the receiving portion includes a plurality of attachment positions at which the set height of the contact portion is changeable, wherein the set height of the contact portion is different between adjacent ones of the plurality of attachment positions.

2. The sheet conveying device according to claim 1, wherein the plurality of attachment positions are groove-shaped portions having different depths.

3. The sheet conveying device according to claim 2, wherein grooves of the groove-shaped portions are triangular or semicircular in cross section.

4. The sheet conveying device according to claim 1, wherein the contact portion of the guide has a linear shape extending in a sheet conveyance direction.

5. The sheet conveying device according to claim 4, wherein the guide includes a wire extending in the sheet conveyance direction.

6. The sheet conveying device according to claim 1, further comprising:

a plurality of guides including the guide and each extending in a sheet conveyance direction; and a support supporting both ends of the plurality of guides in the sheet conveyance direction such that the plurality of guides are rotatable about a virtual axis extending along the sheet conveyance direction, wherein the support and lower end portions of adjacent ones of the plurality of guides are connectable to change the set height of the contact portion.

7. An image forming system comprising:

the sheet conveying device according to claim 1; and an image forming apparatus to form an image on a sheet, wherein the sheet conveying device and the image forming apparatus are integrated as a single unit or coupled as separate units.

* * * * *